Patented May 20, 1947

2,420,644

UNITED STATES PATENT OFFICE

2,420,644

FLAMEPROOFING OF FABRICS AND COMPOSITION THEREFOR

Lyman C. Athy and Paul C. Stufft, Baltimore, Md., assignors to Pemco Corporation, a corporation of Maryland No Drawing. Application June 16, 1942, Serial No. 447,272

13 Claims. (Cl. 117—138)

The present invention relates to a composition for fireproofing or flameproofing materials preferably of cellulosic origin and particularly fabrics. The composition is of particular value in the fireproofing of fabrics adapted to be used for tents, wagon covers, lifeboat covers, tarpaulins, covers for roofing, decking, and the like.

Desirably the composition contains, in addition to the novel fireproofing agent of the present invention, other flame suppressing constituents together with waterproofing agents so that the composite material not only fireproofs or flameproofs, but also waterproofs the material to which it is applied, said material including fabrics such as canvas, ducking, drill cloth, and the like. While the fabrics which may be treated in accordance with the present invention are preferably of cellulosic origin, the composition may be used to treat fabrics of any kind including those made from natural or synthetic mineral or vegetable fibers. Wood may also be waterproofed by the novel fireproofing agent of the present invention.

In accordance with the present invention, the fireproofing composition has as its essential fireproofing agent, the fusion reaction product of a metal compound, a refractory constituent containing silicon, and a basic fluxing constituent adapted to react with acidic refractory to form a glass. The refractory constituent is desirably quartz, but may be feldspar, clay or the like, or a mixture thereof. The fluxing constituent may be borax or any material capable of furnishing boron oxide, soda ash, whiting, barium carbonate, cryolite, and the like. The metal compound may be litharge, red lead, any barium compound forming a barium constituent adapted to combine with the refractory constituent in the primary flux, as for example, barium carbonate, oxide, sulphate, or the like. The fluxing compounds, including barium compounds, should be preferably reduced to the oxide state prior to the fusion of the fireproofing mix, or be reduced to the oxide state early during the heat treatment of the fireproofing mix. Magnesium compounds such as magnesium oxide, magnesium carbonate, usually used as fluxes, may also be used in the production of the firproofing glass of the present invention.

The metal compound of the fireproofing material may be a secondary flux, as for example, lead oxide which reacts with acidic refractory material.

Broadly, the novel fireproofing agent of the present invention comprises a silicate glass, as for example, lead boro-silicate glass, said fireproofing agent desirably having a water solubility of less than 1%, and preferably less than .1%. The essential fireproofing agent of the present invention comprises a fusion reaction product of a metal compound, a refractory constituent furnishing silicon, and a fluxing constitutent, said fusion product preferably having a solubility in water of less than 1% and preferably less than .1%.

As stated, in one form of the invention, the silicate glass is a metal boro-silicate or a boro-silicate of a plurality of metals. However, the invention in its broadest aspect is not limited to a fireproofing agent comprising a metal boro-silicate or a silicate glass having a melting point between 500° F. and 1400° F. and of low water solubility of the character herein specified, may be used, as for example, a lead alumino-silicate. In the preferred form of the invention, the metal component of the metal boro-silicate is lead. There may be substituted in the lead boro-silicates for a portion of the lead, other metal components, as for example, calcium, aluminum, sodium, potassium, titanium, zinc, manganese, antimony, prosphorus, and the like.

If the silicate glass has a melting point greater than about 1400° F., the melting point may be reduced by introducing into the silicate glass a compound which will reduce the melting point of the glass, as for example, lead, strontium, potassium, lithium, or mixtures thereof. The amount of temperature reducing material which will be added to the silicate glass in order to reduce the melting point thereof will vary in accordance with the desired reduction. In this connection, it is desired to point out that the glasses are not definite chemical compounds, but are solid solutions.

It is also desired to point out that the present invention enables the production and utilization of fireproofing compositions in which the amount of the material generating a gas acting as a non-supporter of combustion is reduced. Likewise, the amount of colorant or pigment present in the fireproofing composition may be reduced. The amount of pigment present may be reduced because the material generating a gas, as for example, antimony oxide, acts as an opacifier. When the amount of antimony oxide is reduced, the amount of pigment may be reduced. Stated differently, the greater the amount of antimony oxide, the more colorant or pigmenting material is required to give a specific color when the fireproofing composition is applied to a fabric base.

It has also been discovered that porcelain enamel glasses or vitreous enamels having in general fusion points between about 700° and 1450° to 1500° F. serve to adequately fireproof and/or flameproof materials preferably of cellulosic origin, and particularly the prior art fabrics used in the production of tents, wagon covers, life boat covers, tarpaulins, covers for roofing, decking and the like, the materials of said covers including fabrics such as canvas, ducking, drill cloth, or similar fabrics.

It is preferred to use as the fireproofing agent of the fireproofing composition of the present invention, those porcelain enamel glasses or vitreous enamels which fuse between the above limits to a smooth coating. In other words, the particles or granules of the fireproofing coating, upon fusion, should not only coalesce or stick together, but should coalesce and fuse to form a smooth coating over the fibers it is intended to protect. Further, the vitreous glasses herein disclosed are specifically compounded so that the wetability or interfacial tension between the fused glass and the fibers of the textile fabric or similar fabric will be greater than the surface tension of the exposed glassy surface to thereby insure the fused material flowing along and over the surfaces of the textile fibers to completely protect them from combustion. The vitreous glasses have the advantage that they produce a smoother coating than is produced by ordinary metal silicates of fusion origin or metal borates or metal borosilicates. The latter, on fusion, tend to bead or ball up; that is, produce small globules which do not coalesce sufficiently to produce the desired smooth surface.

It is also desired to point out that the porcelain enamel fireproofing glasses of the present invention have the added advantage that the specific gravities thereof are decidedly lower than the lead silicates and especially the lead boro-silicates which usually have specific gravities varying between 6 and 7. The specific gravities of the vitreous enamels or the porcelain enamel glasses, roughly, vary between 2 and 3.

The glasses above described desirably have a solubility in water of less than 1% and preferably less than .1%.

The invention will be illustrated by the preparation of a lead boro-silicate. The lead boro-silicate may be prepared by mixing 77.6% of lead oxide, $PbO$; 10.9% boric acid, $H_3BO_3$; and 16.3% of silica, $SiO_2$. These materials in a finely divided state are introduced into a mixer and blended to a uniform homogeneous mass, and then introduced into a smelter and smelted at a temperature of about 1400° F. for a suitable period of time, depending upon the amount of material used. When smelting a raw batch of 1000 pounds having the above-identified composition, the batch is heated for approximately one hour at 1440° F. Obviously, the temperature employed may vary, depending upon the amount of materials used and the time of smelting. Since the composition produced from the above mix smelts at a temperature of about 779° F., the mixture should be smelted at a temperature closely adjacent to the melting point thereof or at a temperature higher, depending upon the time of smelting. The smelted lead boro-silicate is removed from the furnace and introduced into a water-quenching pit adapted to granulate and shatter the mass into small particles. The resulting product has the following composition:

Per cent by weight
$PbO$ _____ 77.6
$B_2O_3$ _____ 6.1
$SiO_2$ _____ 16.3

As pointed out, various compounds may be used to furnish the lead component of the mixture, as for example, red lead or minium, lead carbonate and basic lead carbonate. The lead chlorides and sulphates may also be used, but these do not function as efficiently as the lead oxides or lead carbonates. Instead of using boric acid, boric anhydride may be used.

The solubility of the lead boro-silicate produced as above set forth, and in general of the metal boro-silicates, is exceedingly low as compared to the solubility of the compounds which have been previously used in the fireproofing of fabrics of cellulosic origin. In this connection, it is desired to point out that lead borate glass having a composition of 78% $PbO$ and 22% $B_2O_3$ has a solubility of 4.31 parts in 100 parts of water. The lead boro-silicate glass produced as above set forth has a substantially negligible solubility in water, being soluble only to the extent of 0.05 part in 100 parts of water. Not only do the lead boro-silicate glasses have exceedingly low solubility in water, but other metal boro-silicates are also characterized by this low solubility in water, and particularly the alkaline earth boro-silicates.

As pointed out, the boro-silicate fireproofing agent of the present invention may contain, in addition to lead, other metals. The following table sets forth various boro-silicates in which for a portion of the lead there have been substituted other metals, the metal component being usually expressed as the oxide.

Table I

|  | 1 | 2 | 3 | 4 | 5 | 6 | 7 | 8 | 9 | 10 | 11 |
|---|---|---|---|---|---|---|---|---|---|---|---|
| $PbO$ | 77.6 | 67.6 | 67.6 | 67.6 | 72.6 | 88 | 77.6 | 60 | 70 | 70 | 50 |
| $B_2O_3$ | 6.1 | 6.1 | 6.1 | 6.1 | 6.1 |  | 10.4 | 10 | 10 | 8 | 12 |
| $SiO_2$ | 16.3 | 16.3 | 16.3 | 16.3 | 16.3 | 12 | 12.0 | 20 | 15 | 15 | 25 |
| $ZnO$ |  | 10.0 |  |  |  |  |  | 3 |  |  | 6 |
| $CaO$ |  |  | 10.0 |  |  |  |  | 3 |  |  |  |
| $BaO$ |  |  |  | 10.0 |  |  |  |  |  |  |  |
| $Na_2O$, $K_2O$ or $Li_2O$ |  |  |  |  | 5.0 |  |  | 4 |  |  | 2 |
| $CaF_2$ |  |  |  |  |  |  |  |  |  | 7 | 5 |

Instead of using lead boro-silicate as the fireproofing agent, the following may be utilized: zinc boro-silicate, manganese boro-silicate, magnesium boro-silicate, barium boro-silicate, calcium boro-silicate, strontium boro-silicate, titanium boro-silicate, and aluminum boro-silicate.

In an article appearing in Sprechsaal, volume 62, beginning with page 699, 1929, said article also appearing in the Journal of the Society of Glass Technologists, volume 14, page 9A, there is set forth the softening temperatures of various ternary eutectics formed by lead, potassium, sodium, alumino- and boro-silicates. The following sets forth the melting points of certain boro-silicates and the comparison thereof with the melting point ascertained by Kai-Ching Lu:

| Composition | Melting Point | | Formation Temperature |
|---|---|---|---|
|  | Nekritsch | Kai-Ching Lu |  |
|  | Degrees C. | Degrees C. | Degrees C. |
| 1. $PbO$, $0.238B_2O_3$, $0.78SiO_2$ | 485 | 415 | 750 |
| 2. $PbO$, $0.254Al_2O_3$, $1.91SiO_2$ | 790 | 650 | 1,150 |
| 3. $Na_2O$, $1.29B_2O_3$, $1.73SiO_2$ | 630 | 570 | 800 |
| 4. $K_2O$, $2.11B_2O_3$, $2.585SiO_2$ | 820 | 655 | 1,100 |

The lead boro-silicates and the sodium boro-silicates have the lowest melting points and the potassium boro-silicate has the highest melting point. The lead alumino-silicate has an intermediate melting point. The addition of aluminum oxide, $Al_2O_3$, to lead silicate increases the melting point of the lead silicate with successive additions. In accordance with the present invention, if the metal silicate glass has such a high melting point as to resist reduction to a flow state at the combustion temperatures of the fabric, the melting point may be reduced by incorporating in the mixture a lead component to produce a double metal silicate or double metal boro-silicate. It is important to note that in accordance with the present invention, only such metal silicates or metal boro-silicates and/or boro-silicates containing a plurality of metal components, as for example, lead and calcium or lead and barium or sodium and calcium, may be used provided said silicates do not have a water solubility greater than 1% and preferably not greater than .1%.

When 77.6 parts by weight of lead oxide, 10.9 parts by weight of boric acid, and 16.3 parts by weight of silica are smelted together, there is formed an eutectic mixture which may be expressed on an oxide basis as follows: 77.6% by weight of lead oxide, 6.1% by weight of boron oxide, and 16.3% silica. While it is preferred to use the eutectic ternary silicate glasses as the novel fireproofing agent of the present invention, it is also within the present invention to use non-eutectic ternary silicate glasses including the non-eutectic metal boro-silicate glasses. As an example of a non-eutectic mixture which may form the novel fireproofing agent of the fireproofing composition herein set forth, the lead oxide content of the smelted fireproofing agent may be reduced to 65%. The boron oxide and silicon dioxide will then be increased, the former to 9.5% and the latter to 25.5%.

In accordance with the present invention, the specific gravity of the metal silicate may be controlled within limits by reducing the amount of heavy metal components present in the solid solution. It may be stated that the total amount of fireproofing agent with which a given fabric may be impregnated is limited. Therefore, the less dense the firepoofing agent, the greater volume thereof may be used. Lead boro-silicate has a specific gravity varying between 6 and 7. In accordance with the present invention, the specific gravity of the metal silicates of fusion origin may be lowered by introducing in place of the heavy metal a less dense metal. For example, the specific gravity of the lead boro-silicates may be reduced by substituting for a portion of the lead component aluminum, zinc, calcium, manganese, strontium, barium, potassium or sodium. This principle may be used in reducing the specific gravity of any metal silicate of fusion origin adapted to carry out the present invention, including fusion silicates specifically herein set forth. All of the metal silicates including the boro-silicates must fuse sufficiently at or adjacent the combustion temperature of the fabric to which the fireproofing medium is applied to coat the fibers of the fabric or other medium and thereby prevent the penetration of atmospheric oxygen into the zone of combustion adjacent the fabric. Simultaneously, the metal silicate component of the present fireproofing and waterproofing composition must be sufficiently viscous at the temperature of combustion of the fabric or immediately below the same so that the metal silicate will be retained by the fibrous portions exposed to combustion. In other words, the fluidity of the metal silicates of the present invention must be such that the silicates will not run off from the fibrous portions of the fabric exposed to combustion.

The novel fireproofing material of the present invention is preferably incorporated in a composition containing a material capable of supplying at or adjacent to the combustion temperature of the impregnated fabric, a gas which is a non-supporter of combustion. Preferably, the metal silicate glass or the metal boro-silicate glass of the present invention is incorporated in a mix containing a chlorinated material adapted to generate at and adjacent combustion temperatures of the impregnated fabric, chlorine or hydrogen chloride, which functions to smother the flame. These highly chlorinated compounds should not contain oxygen which will be liberated at the temperature of combustion. Further, the chlorinated compounds should resist action by atmospheric agencies such as light, moisture and heat. It is desirable that the chlorinated compounds or other compounds used to provide a non-supporter of combustion decompose at or adjacent the low combustion temperatures of cellulosic fabrics or at the low combustion temperature of wood. Desirably, the chlorinated compounds having a high content of chlorine, as between 60% and 70%, should have waterproofing properties so as to perform the dual function of supplying a non-supporter of combustion while simultaneously waterproofing the fabric or other material treated.

Examples of prior art chlorinated materials which release chlorine are chlorinated paraffin or paraffin oil, chlorinated vinyl resin, chlorinated naphthalene, chlorinated oils such as vegetable, animal and mineral oils, chlorinated diphenyl, chlorinated rubber, and the like.

These materials are usually mixed with a volatile solvent in order to adapt the fireproofing composition for efficient impregnation of the fabric, wood or other material which is being treated. Desirably, the volatile solvent may be coal tar naphtha, carbon tetrachloride, benzol, ethylene chloride, or the highly volatile ester solvents such as methyl acetate, ethyl acetate, propyl acetate, butyl acetate, or any of the mixed solvents such as methyl ethyl acetate.

A plasticizer is preferably included in the composite fireproofing and waterproofing composition so that when the composite composition is applied to a fabric, the fabric will retain its pliability. Any suitable plasticizer may be used, including tricresyl phosphate.

In the preferred form of the invention, it is desirable that the fireproofing composition containing the metal silicate or metal boro-silicate contain, in addition to the highly chlorinated material, an additional component serving to generate a gas acting as a non-supporter of combustion. Antimony trioxide is an example of a material which may be mixed with the metal silicates or metal boro-silicates of the present invention to provide a supplementary source of a gas which is capable of being thermally decomposed at or adjacent combustion temperatures of the materials which are coated or impregnated with the present fireproofing composition. The presence of such a volatile gas in small quantities adjacent the burning surface prevents the oxygen of the air from combining with the heated material undergoing combustion. Instead of using antimony oxide, any antimony material may be used which will generate a volatile antimony gas at or adjacent the combustion temperature of the impregnated wood or other material. Sodium antimonate is an example of a typical equivalent of the antimony oxide. As stated, the secondary non-supporter of combustion may be used with or without the primary agent acting as a non-supporter of combustion, as typified by a chlorinated hydrocarbon.

The fireproofing composition may contain a pigmenting material so that the fabric which is impregnated may be fireproofed, waterproofed, and simultaneously colored. Instead of adding a pigmenting material to the composition, as has been customary in the prior art, it has been ascertained that the fireproofing glasses of the present invention may be colored during smelting by incorporating in the raw batch which is to be smelted a suitable coloring agent. For example, when a lead boro-silicate batch is prepared by mixing 77.6% of lead oxide, PbO; 10.9% of boric acid, $H_3BO_3$; and 16.3% silica, there may be incorporated in said batch a small amount of a coloring agent. For example, to produce an olive drab green, there may be added 5% of iron oxide, $Fe_2O_3$, together with a .5% of chromium oxide, $Cr_2O_3$. If a blue coloration is desired, a small amount of cobalt oxide, $Co_3O_4$, as for example, about .5%, may be incorporated in the raw batch above set forth. It is believed to be novel to fireproof fabrics with a metal silicate or metal boro-silicate of fusion origin which has been colored during the smelting of the glass, thereby avoiding the separate addition of a pigment to the composite fireproofing composition of which the metal silicate glass is the essential fireproofing agent.

The waterproofing and fireproofing agent of the present invention usually contains about 65% of a vehicle comprising a chlorinated organic compound of the character set forth, said vehicle, which is adapted to supply a non-supporter of combustion, being dissolved in a volatile solvent such as herein set forth. The novel fireproofing agent of the present invention may vary in amount, but is usually present in an amount varying between 5% to 25%. These figures are merely illustrative and not limiting, and the amount of novel fireproofing agent which may be present in the composite waterproofing and fireproofing composition may be greatly below or greatly above. The point is that the novel fireproofing metal silicate or metal boro-silicate, including lead boro-silicate, should be present in a sufficient quantity per unit of surface of the material being fireproofed to effectively smother combustion in a burning area and closely adjacent thereto.

The following pigments give satisfactory results when employed as the coloring medium: chromium iron oxide, black iron oxide, red iron oxide, yellow iron oxide, and titanium oxide.

In preparing the composite fireproofing composition, the metal silicate glass is ground to pass a 100 mesh sieve with a residue of not more than 10% on a 200 mesh sieve. The antimony compound and the pigmenting component are also ground to equivalent fineness. These ingredients are mixed together with a chlorinated hydrocarbon and milled together in a blending mill, such as a paint mill or a ball mill.

While it is recognized that the percentage composition of the completed fireproofing composition will vary depending upon the vehicle used and the color desired, the present invention may be illustrated by several examples. The chlorinated hydrocarbons and solvents or similar materials are herein designated "the vehicle."

It has hitherto been proposed to make fireproofing compositions, using about 65% vehicle, 20% of a material generating a gas which is a non-supporter of combustion, as for example, antimony oxide, $Sb_2O_3$, and 15% colorant or pigmenting material. In accordance with the present invention, it is possible to reduce the amount of antimony oxide used and the amount of pigmenting material. For example, the composition of a fireproofing material made in accordance with the present invention may be 65% vehicle, 21% of a silica containing component of fusion origin, as for example, a metal boro-silicate glass or a vitreous enamel or glass of the character herein set forth; 8% colorant, and 6% antimony trioxide. In the latter example, the colorant has been reduced from 15% to 8% and the antimony oxide from 20% to 6%. It has also been proposed to use a fireproofing composition containing 65% vehicle, 20% pigment or colorant and 15% antimony oxide. Utilizing the present invention, the composition may contain 65% vehicle, 15% colorant or pigment, 6% antimony trioxide, and 14% of any of the glasses herein set forth or their equivalents, and especially 14% of a metal boro-silicate glass or a porcelain enamel glass.

It is to be noted that in the preferred form of the present invention, the fused fireproofing inorganic material of the character herein set forth is substituted for the antimony oxide or other material generating a gas which is a non-supporter of combustion, and the pigmenting material. When the antimony oxide is reduced, it is desirable, if not necessary, to reduce the amount of pigmenting material due to the decreased whiteness of the resulting fusion product. In other words, the antimony oxide acts as an opacifier, and a greater amount of colorant is required to give a specific color than when the fused fireproofing material of the present invention is partially substituted therefor.

The fireproofing composition of the present invention may comprise 65% vehicle, 19% of a fused inorganic fireproofing material having a fusion point between 700° and 1500° F., said material being adapted to fuse when in place on the material which is to be fireproofed to a smooth state; 6% of antimony oxide or equivalent; 8% of colorant, and 2% of magnesium carbonate.

Broadly, the ability of a material of fusion origin to give adequate fireproofing protection depends on the ability of said material to fuse when the fabric being protected is heated to or adjacent the combustion temperature of the fabric. It is desired to point out that there is a difference between the temperature at which granules of the fused product stick together and the temperature at which said granules fuse to a smooth liquid surface. Several of the glasses which were tested, after being applied to fabric, showed that the granules stuck together at about 1000° F. and fused to a smooth surface affording adequate protection to the surfaces of the fabric fibers at a temperature of 1300° F. The cone deformation temperature of this glass was 1170° F.

In another example, the granules, after being applied to the fabric, began to stick together at approximately 1150° F. and smoothed out to a smooth liquid protective medium at 1300° F. Cone deformation of this material was 1260° F., which was almost 100 degrees higher than that exhibited by the first material above set forth.

A third glass showed cohesion of granules at 1050° F., but did not fuse out to a smooth protective coating until about 1450° F. The best fireproofing protection was furnished by the first two glasses, which fused to a smooth protective fireproofing coating at 1300° F. It is desired to point out that the cone deformation temperature of a material is not indicative of its ability to give adequate protection; that is, form a desirable smooth liquid protective fireproofing coating.

The following are examples of vitreous enamels which may be used as the novel fireproofing component of a fireproofing composition:

*Table II*

| Raw Batch Composition | Example 1 | Example 2 | Example 3 |
|---|---|---|---|
|  | Pounds | Pounds | Pounds |
| Silica | 162 | 222 | 180 |
| Dehydrated Borax | 208 | 208 | 115 |
| Sodium Nitrate |  | 36 | 60 |
| Cryolite |  |  | 78 |
| Sodium Carbonate |  |  | 125 |
| Fluorspar | 185 |  | 78 |
| Zinc Oxide |  | 72 | 25 |
| Boric Acid |  | 28 | 10 |
| Calcium Carbonate |  | 33 |  |
| Dolomite | 100 |  | 100 |
| Barium Carbonate |  | 40 | 80 |
| Pyrophilite | 25 |  |  |

*Table III*

| Ingredients Expressed as Oxides | Example 1 | Example 2 | Example 3 |
|---|---|---|---|
|  | Per cent Comp. by wt. | Per cent Comp. by wt. | Per cent Comp. by wt. |
| $SiO_2$ | 24.4 | 37.4 | 25.5 |
| $B_2O_3$ | 11.1 | 26.8 | 12.0 |
| $Na_2O$ | 24.8 | 12.9 | 20.0 |
| $CaO$ | 23.2 | 3.2 | 12.2 |
| $F$ | 12.2 |  | 11.3 |
| $ZnO$ | 0 | 12.1 | 3.5 |
| $MgO$ | 3.8 |  | 3.1 |
| $Al_2O_3$ | 0.7 | 2.4 | 3.4 |
| $BaO$ |  | 5.2 | 8.8 |
| Char Length, U. S. Gov't. Spec. CCC-746 | 1.4" | 1.3" | 1.3" |

The compositions set forth in the above examples all have melting points between 700° and 1400° F., and fuse when on the material which is fireproofed when the latter is subjected to a combustion temperature, to a smooth liquid protective coating having sufficient viscosity to be retained on the fibers of the fabric.

Referring to the fireproofing compositions set forth in Tables II and III, these glasses are all compounded of a refractory agent together with fluxing agents. Silica is typical of the refractory material, although other materials may be used, such as quartz, feldspar and clay. The refractory component in general usually contributes the acidic part of the melt and gives body to the glass. The fluxes are typified by such materials as borax, sodium nitrate, fluorspar, barium carbonate, calcium carbonate, dolomite and the like. Fluxes in general are basic in character and react with the acidic refractory to form the glass. Therefore, broadly, the glasses of the present invention are produced by fusing together a refractory material with a fluxing material, the refractory material preferably furnishing the acidic portion of the melt while the flux furnishes the basic portion of the melt and reacts with the acidic refractories to form the final glass. It is to be understood that the present invention is not limited to the utilization of glasses of the character above set forth, but any of the prior art glasses or porcelain enamels may be used which have a suitable fusion point and which form a smooth viscous protective liquid coating on the fabric at a temperature varying between 700° and 1300° to 1500° F.

Referring to the term "char length" as set forth at the bottom of Table II, it is desired to point out that said term has reference to the resistance to fire of textile fabric impregnated with said fire-proofing material. When tested in accordance with Federal Standard Specification CCC-D-746, entitled "Federal Specification for Duck, Cotton; Fire, Water and Weather Resistant," paragraph E-7 and F-2-a; said specification provides that impregnated textile fabric specimens measuring 2 x 12½" shall be suspended vertically by a clamp covering the upper ½" of the specimen and the apparatus enclosed in a sheet metal shield 12" wide, 12" deep and 30" high to protect the specimens from draft, sufficient room being left at the bottom of the frame to allow manipulation of the gas burner to be used in igniting the specimens which shall then be ignited by supporting the lower end ¾" above the top of a Bunsen gas burner adjusted to give a luminous flame 1½" long for 12 seconds. Said specimens shall not continue flaming for more than two seconds after the burner flame is withdrawn.

It is further specified that the charred area of said test specimens shall support a tearing weight as set forth in Table II of said specifications at an average distance (for 10 specimens), of not more than 3½" from the bottom of the specimen, maximum length of char of any one specimen being 4½".

It is desired to point out that in order to meet the above set forth specification tests, a fireproofing material must impart three characteristics to the textile fabric in which it is impregnated. First, said fireproofing compound must prevent continued flaming of the textile for more than two seconds after the primary source of combustion is removed. Second, said fireproofing impregnating material must prevent the so-called "creep or after-glow," that is to say, continued smoldering of the material after the flame is extinguished. Third, it must inhibit the breakdown of the fabric over those portions which have not been combusted by the flame or the so-called "after-glow" or smoldering action.

It is desired to point out that while some materials used for textile fabric fireproofing show very excellent results as regards to their ability to extinguish the initial flame and to inhibit the after-glow or creep, these have not been satisfactory as regards the third characteristic as set forth above; to wit, the protection of said textile fabric from distintegration due to the heat generated in the combustion process. It will be noted that all three of the examples set forth in Tables II and III show a char length which is less than ½ of the allowed char length of the aforesaid Federal Standard Specification CCC-D-746, which is 3½".

It is desired to point out that the above excellent fireproofing resistance of the present invention fireproofing material is due in large part to its ability to prevent the spread of the creep, or after-glow, and also to inhibit the disintegration of the impregnated textile fabric due to the temperatures of the combustion.

It has been discovered that the presence of a comparatively small percentage of antimony oxide in the amount of approximately 6% will satisfactorily function as a flame extinguisher. The function of the novel material of the present invention being to inhibit after-glow or creep as well as the thermal disintegration of the textile fabric.

It is desired to point out that in the fireproofing compositions of the prior art containing a vehicle, a material generating a gas which is a non-supporter of combustion, as for example, antimony oxide, and a pigmenting material, as previously herein set forth in detail, it is possible to reduce the amount of non-supporter of combustion used and leave the amount of pigmenting material the same, or, in the alternative, reduce both the amount of non-supporter of combustion and the amount of pigmenting material.

Having thus described the invention, what is claimed as new and desired to be secured by Letters Patent is:

1. A fabric base material of cellulosic origin flameproofed with a solid vitreous enamel silicate which fuses adjacent the combustion temperature of the base material to a viscosity which enables it to be retained on the base material, said solid enamel silicate having been formed by smelting the components thereof at a temperature above its melting point to produce a homogeneous vitreous enamel silicate.

2. A fabric base material of cellulosic origin flameproofed with a solid vitreous enamel silicate which fuses adjacent the combustion temperature of the fabric to a viscosity enabling the fused material to be retained on the fabric, said vitreous enamel having a solubility in water of less than 1%, said solid vitreous enamel silicate having been formed by smelting the components thereof at a temperature above its melting point to a produce a homogeneous vitreous enamel silicate.

3. The method of preventing (a) continued flaming of a combustible fabric after the primary source of comubustion is removed, (b) after-glow and (c) the break-down of the fabric over those portions which have not been combusted by flame, comprising forming on said fabric at a temperature adjacent to the fabric combustion temperature and from a previously applied solid flameproofing agent, a viscous protective coating comprising as its essential protective flameproofing agent the reaction-product of a metal compound, a refractory constituent furnishing silicon, and a fluxing constituent, said reaction-product remaining liquid and being retained on the fabric surface adjacent the fabric combustion temperature, said reaction product having been formed by smelting the components thereof at a temperature above its smelting point to produce a homogeneous fusion reaction product.

4. The method of preventing (a) continued flaming of a combustible fabric after the primary source of combustion is removed, (b) after-glow and (c) the break-down of the fabric over those portions which have not been combusted by flame, comprising forming on said fabric at a temperature adjacent to the fabric combustion temperature and from a previously applied composition containing a non-supporter of combustion and a solid metal silicate, a viscous liquid protective coating which remains liquid and is retained on the fabric surface adjacent the fabric combustion temperature, said solid metal silicate having been formed by smelting the components thereof at a temperature above its melting point to produce a homogeneous metal silicate.

5. The method of preventing (a) continued flaming of a combustible fabric after the primary source of combustion is removed, (b) after-glow and (c) the break-down of the fabric over those portions which have not been combusted by flame, comprising forming on said fabric at a temperature adjacent to the fabric combustion temperature and from a previously applied composition containing a non-supporter of combustion and a solid metal silicate, a viscous liquid protective coating which remains liquid and is retained on the fabric surface adjacent the fabric combustion temperature, said solid metal silicate having a melting point varying between 700° F. and 1500° F., said solid metal silicate having been formed by smelting the components thereof at a temperature above its melting point to produce a homogeneous vitreous enamel silicate.

6. The method of claim 4 in which the metal silicate of fusion origin is a boro-silicate.

7. The method of claim 4 wherein the metal silicate is a lead-containing boro-silicate.

8. The method of weatherproofing a combustible fabric prior to the time it is acted upon by a combustion medium, and preventing after the fabric has been acted upon by the combustible medium and the same has been removed, (a) continued flaming of the fabric, (b) after-glow, and (c) the break-down of the fabric over those portions which have not been combusted by flame, comprising treating the fabric with a composition having as its essential flameproofing agent the solid reaction-product of a metal compound, a refractory constituent furnishing silicon, and a fluxing constituent, said flameproofing agent having a water solubility below 1% whereby the fabric is substantially weatherproofed, said reaction-product having a melting point between 700° F. and 1500° F.; and forming from said flameproofing agent and on said fabric at a temperature adjacent the fabric combustion temperature a protective coating having a viscosity enabling it to be retained on said fabric and functioning to preserve the same, said solid reaction product having been formed by smelting the components thereof at a temperature above its melting point to produce a homogeneous fusion reaction product.

9. A fabric impregnated and flameproofed with a metal boro-silicate glass having a solubility in water of less than 1%, said glass fusing adjacent the combustion temperature of the fabric and having a viscosity in its fused state enabling it to be retained on the fabric, said glass having been formed by smelting the components thereof at a temperature above its melting point to produce a homogeneous glass.

10. A fabric impregnated and flameproofed with a lead boro-silicate glass having a solubility in water of less than 1%, said glass fusing adjacent the combustion temperature of the fabric, having a viscosity in its fused state enabling it to be retained on the fabric, said boro-silicate glass having been formed by melting the components thereof at a temperature above its melting point to produce a homogeneous glass.

11. In a composition for flameproofing a base material a flameproofing medium having as its essential flameproofing agent a solid vitreous enamel material having a solubility in water of less than 1% and a melting point between 700° F. and 1500° F., said enamel material having been formed by smelting the components thereof at a temperature above its melting point to produce a homogeneous vitreous enamel material, said vitreous enamel material forming a viscous protective coating on the base material when subjected to temperatures adjacent the combustion point of the base material; together with a material supplying a gas acting as a non-supporter of combustion; and a pigmenting agent.

12. In a composition for flameproofing and waterproofing a base material, a waterproofing material, and a flameproofing medium having as its essential flameproofing agent a solid vitreous enamel silicate having a solubility in water of less than 1% and a melting point between 700° F. and 1500° F., said enamel silicate having been formed by smelting the components thereof at a temperature above its melting point to produce a homogeneous vitreous enamel silicate, said enamel silicate forming a viscous protective coating on the base material when subjected to temperatures adjacent the combustion point of the base material.

13. In a flameproofing composition for flameproofing a base material, a flameproofing medium having as its essential flameproofing agent a solid vitreous enamel silicate having a water solubility of less than 1% and a melting point between 700° F. and 1500° F., said vitreous enamel silicate having been formed by smelting the components thereof at a temperature above its melting point to produce a homogeneous vitreous enamel silicate, said vitreous enamel silicate forming a viscous protective coating on the base material when subjected to temperatures adjacent the combustion point of the base material; together with a material supplying a gas acting as a non-supporter of combustion; and a pigmenting agent.

LYMAN C. ATHY.
PAUL C. STUFFT.

REFERENCES CITED

The following references are of record in the file of this patent:

UNITED STATES PATENTS

| Number | Name | Date |
|---|---|---|
| 1,471,792 | Hines | Oct. 23, 1923 |
| 1,804,417 | Herting | May 12, 1931 |
| 1,813,367 | Thompson | July 7, 1931 |
| 2,118,787 | Clayton et al. | May 24, 1938 |
| 2,331,357 | Swenson | Oct. 12, 1943 |
| 2,044,176 | McCulloch | June 16, 1936 |
| 1,896,042 | Ruben | Jan. 31, 1933 |
| 1,896,040 | Ruben | Jan. 31, 1933 |

FOREIGN PATENTS

| Number | Country | Date |
|---|---|---|
| 540,642 | Great Britain | Oct. 24, 1941 |
| 846,522 | France | June 12, 1939 |